(12) United States Patent
Filippov et al.

(10) Patent No.: US 8,551,389 B2
(45) Date of Patent: Oct. 8, 2013

(54) METHOD FOR PRODUCING ANISOPTROPIC BULK MATERIALS

(75) Inventors: Andrey V Filippov, Painted Post, NY (US); Charlotte Diane Milia, Corning, NY (US)

(73) Assignee: Corning Incorporated, Corning, NY (US)

( * ) Notice: Subject to any disclaimer, the term of this patent is extended or adjusted under 35 U.S.C. 154(b) by 37 days.

(21) Appl. No.: 13/232,386

(22) Filed: Sep. 14, 2011

(65) Prior Publication Data

US 2012/0001368 A1 Jan. 5, 2012

Related U.S. Application Data

(62) Division of application No. 11/804,848, filed on May 21, 2007, now Pat. No. 8,057,889.

(51) Int. Cl.
*B29C 67/20* (2006.01)
*B29C 70/04* (2006.01)

(52) U.S. Cl.
USPC ............................ 264/427; 264/437; 264/108

(58) Field of Classification Search
USPC .................................. 264/427, 437, 435, 413
See application file for complete search history.

(56) References Cited

U.S. PATENT DOCUMENTS

| | | | |
|---|---|---|---|
| 3,066,355 A | 12/1962 | Schloemann et al. | 18/48 |
| 3,791,864 A * | 2/1974 | Steingroever | 427/550 |
| 3,977,984 A | 8/1976 | Roberts | 252/62.54 |
| 4,250,128 A | 2/1981 | Meckling | 264/24 |
| 6,376,393 B1 | 4/2002 | Newton et al. | 438/783 |
| 6,844,378 B1 * | 1/2005 | Martin et al. | 523/300 |
| 2003/0194544 A1 * | 10/2003 | Tobita et al. | 428/297.7 |
| 2004/0052976 A1 | 3/2004 | Buczek et al. | 427/598 |
| 2007/0281127 A1 * | 12/2007 | Backhaus-Ricoult et al. | 428/116 |

FOREIGN PATENT DOCUMENTS

JP 2000-344585 * 12/2000

OTHER PUBLICATIONS

Viscoplastic Deformation of an epoxy resin at elevated temperatures; E. Kontou, Journal of applied polymer science, vol. 101, pp. 2027-2033, (2006).*
Breval, E., Klimkiewicz, M., Shi, Y.T., Arakaki, D. and Dougherty, J.P. (2003) Magnetic alignment of particles in composite films. *J. Mat. Sci.* 38, 1347-1351.
Burke, N.A.D., Stover, H.D.H. and Dawson, F.P. (2002) Magnetic nanocomposites: Preparation and characterization of polymer-coated iron nanoparticles. *Chem. Mat.* 14, 4752-4761.

(Continued)

*Primary Examiner* — Joseph S Del Sole
*Assistant Examiner* — Kimberly A Stewart
(74) *Attorney, Agent, or Firm* — Jason A. Barron

(57) ABSTRACT

A method is disclosed for manufacturing an anisotropic material comprising providing a viscoplastic material having a yield stress, and a plurality of magnetic particles disposed therein, and then subjecting the viscoplastic material to a magnetic field for a time sufficient to at least partially align at least a portion of the magnetic particles to at least one of a predetermined position or orientation. Also disclosed is an article having anisotropic properties comprising a viscoplastic material, and a plurality of magnetic particles distributed therein and at least partially aligned to a predetermined orientation. An article having anisotropic properties, comprising a fixed viscoplastic material, and a plurality of magnetic particles distributed and at least partially anisotropically aligned in the fixed viscoplastic material is disclosed.

20 Claims, 3 Drawing Sheets

(56) References Cited

OTHER PUBLICATIONS

Kroger, M., Ilg, P. and Hess, S. (2003) Magnetoviscous model fluids. *J. Phys.-Cond. Mat.* 15, S1403-S1423.

Sakka, Y and Suzuki, T.S. (2005) Textured development of feeble magnetic ceramics by colloidal processing under high magnetic field Journal of the Ceramic Society of Japan 113 (1313): 26-36 Jan. 2005.

Landau, L.D. and Lifshitz, E.M. (1984) Electrodynamics of continuous media. Elsevier Butterworth-Heinemann, Burlington MA (entire book referenced, not enclosed).

Sakka et al., "Fabrication of oriented β-alumina from porous bodies by slip casting in a high magnetic field", Solid State Ionics, North Holland Pub. Company, Amsterdam, NL, vol. 172, No. 1-4, Aug. 31, 2004, pp. 341-347.

* cited by examiner

METHOD FOR PRODUCING ANISOPTROPIC BULK MATERIALS

CROSS-REFERENCE TO RELATED APPLICATIONS

This application is a divisional of U.S. patent application Ser. No. 11/804,848 filed on May 21, 2007 now U.S. Pat. No. 8,057,889, the content of which is relied upon and incorporated herein by reference in its entirety, and the benefit of priority under 35 U.S.C. §120 is hereby claimed.

BACKGROUND OF THE INVENTION

1. Field of the Invention

The present invention relates to anisotropic materials and specifically to ceramic articles having anisotropic properties.

2. Technical Background

Magnetic particles can be oriented and aligned under the influence of a magnetic field. In certain applications, such as ferrofluids, a suspension of magnetic particles can be oriented and/or aligned in a magnetic field, but the induced order dissipates after removal of the magnetic field due to competing forces, such as gravity and Brownian motion.

Ceramic articles can be manufactured in varying shapes and forms for applications, such as particulate filters. In such applications, ceramic articles can be formed with pores in the ceramic matrix to enhance the thermal conductivity, and thus, long term stability of the device. Such ceramic articles having controlled pore structures are difficult to manufacture with current technologies.

There is a need to address the aforementioned problems and other shortcomings associated with anisotropic materials, such as, ceramic articles. These needs and other needs are satisfied by the methods of the present invention.

SUMMARY OF THE INVENTION

The present invention relates to anisotropic materials and specifically to ceramic articles having anisotropic properties. The present invention addresses at least a portion of the problems described above through the use of a novel method for preparing anisotropic materials.

In a first aspect, the present invention provides a method for manufacturing an anisotropic material comprising providing a viscoplastic material having a yield stress, and a plurality of magnetic particles disposed therein; and then subjecting the viscoplastic material to a magnetic field for a time sufficient to at least partially align at least a portion of the magnetic particles to at least one of a predetermined position or orientation.

In a second aspect, the present invention provides an anisotropic material made by the method described above.

In another aspect, the present invention provides an article having anisotropic properties comprising a viscoplastic material and a plurality of magnetic particles distributed therein and at least partially aligned to at least one of a predetermined position or orientation.

In yet another aspect, the present invention provides an article having anisotropic properties comprising a fixed viscoplastic material and a plurality of magnetic particles distributed and at least partially aligned to at least one of a predetermined position or orientation.

Additional aspects and advantages of the invention will be set forth, in part, in the detailed description, figures, and any claims which follow, and in part will be derived from the detailed description or can be learned by practice of the invention. The advantages described below will be realized and attained by means of the elements and combinations particularly pointed out in the appended claims. It is to be understood that both the foregoing general description and the following detailed description are exemplary and explanatory only and are not restrictive of the invention as disclosed.

BRIEF DESCRIPTION OF THE DRAWINGS

The accompanying drawings, which are incorporated in and constitute a part of this specification, illustrate certain aspects of the present invention and together with the description, serve to explain, without limitation, the principles of the invention. Like numbers represent the same elements throughout the figures.

DETAILED DESCRIPTION OF THE INVENTION

Figure 1:
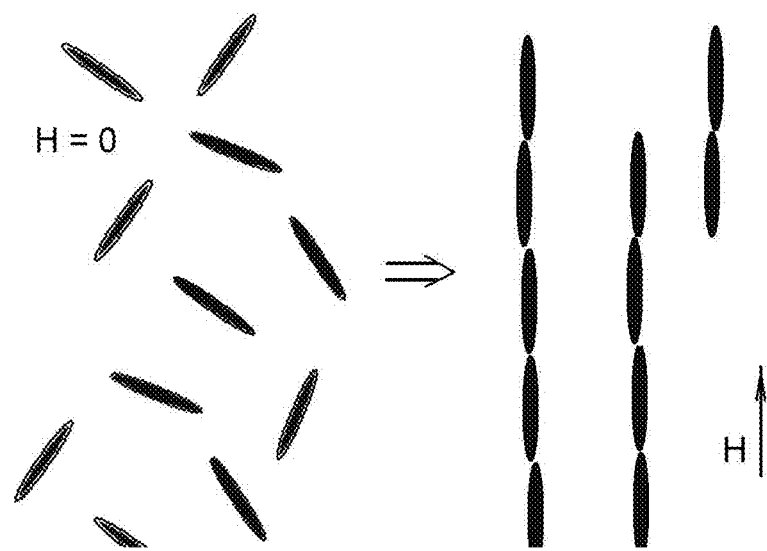
FIG. 1 is a schematic illustrating the orientation and alignment of non-spherical (prolate) magnetic particles upon exposure to a magnetic field.

The present invention can be understood more readily by reference to the following detailed description, drawings, examples, and claims, and their previous and following description. However, before the present compositions, articles, devices, and methods are disclosed and described, it is to be understood that this invention is not limited to the specific compositions, articles, devices, and methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its currently known embodiments. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

Disclosed are materials, compounds, compositions, and components that can be used for, can be used in conjunction with, can be used in preparation for, or are products of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

In this specification and in the claims which follow, reference will be made to a number of terms which shall be defined to have the following meanings:

As used herein, the singular forms "a," "an" and "the" include plural referents unless the context clearly dictates otherwise. Thus, for example, reference to a "component" includes aspects having two or more such components, unless the context clearly indicates otherwise.

"Optional" or "optionally" means that the subsequently described event or circumstance can or cannot occur, and that the description includes instances where the event or circumstance occurs and instances where it does not. For example, the phrase "optionally substituted component" means that the component can or can not be substituted and that the description includes both unsubstituted and substituted aspects of the invention.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, a "wt. %" or "weight percent" or "percent by weight" of a component, unless specifically stated to the contrary, refers to the ratio of the weight of the component to the total weight of the composition in which the component is included, expressed as a percentage.

As used herein, a "vol. %" or "volume percent" or "percent by volume" of a component, unless specifically stated to the contrary, refers to the ratio of the volume of the component to the total volume of the composition in which the component is included, expressed as a percentage.

The following US patent describes various compositions and methods for making a ceramic body, such as, for example, a honeycombed monolithic fired ceramic, and is hereby incorporated by reference in its entirety and for the specific purpose of disclosing materials and methods relating to the formation of such a ceramic body: U.S. Pat. No. 3,885,977.

As briefly introduced above, the present invention provides a method for manufacturing an anisotropic material through the use of a viscoplastic material and a plurality of magnetic particles disposed therein. An anisotropic material formed by the methods of the present invention can have specifically tailored properties, such as, for example, thermal conductivity, electrical conductivity, and/or magnetic permeability. An anisotropic material formed by the methods of the present invention can also have a specifically tailored physical structure, such as, for example, a structured pattern of pores.

Alignment of Magnetic Particles

It is generally known that magnetic particles can be aligned along the field lines of a magnetic field. Particles can align to a particular orientation due to the torque (T) acting on a magnetic particle. The torque can be expressed by the equation $T = M \times H$, where M represents the vector of magnetic moment of the magnetic particle and H represents the vector of intensity or strength of the magnetic field. Similar to the orientation of a compass arrow in the Earth's magnetic field, the torque on a magnetic particle can align the particle in such a way that the magnetic moment is parallel to the magnetic field.

In addition, a magnetic field can exert a force on a magnetic particle. The perturbation of a magnetic field by individual particles can result in a force that can attract magnetic particles together so that they form lines or bridges in, for example, a head-to-tail alignment. In conventional suspensions, such as, for example, ferrofluids, magnetic particles can align in the presence of a magnetic field. In these conventional systems, the alignment and/or order of magnetic particles will diminish after removal of the magnetic field by, for example, Brownian motion of the particles.

The present invention provides a method to induce order and/or alignment of magnetic particles in a material wherein the order can be maintained after removal of the magnetic field, and even when the material is further heated and processed in one or more down-stream processing steps.

Viscoplastic Material

Viscoplastic materials are one of several types of non-Newtonian liquids. Viscoplastic materials and other non-Newtonian fluids are classified as such because they do not conform to Stokes' law of viscosity. Viscoplastic materials have a threshold yield stress and when they are exposed to a shear stress less than the threshold yield stress at a given temperature or temperature range, the material behaves like a solid, showing little or no deformation. When exposed to a shear stress greater than the threshold yield stress, the material can flow like, for example, a viscous liquid. As a result, viscoplastic materials are frequently referred to as "yield stress" fluids and the terms viscoplastic fluid, viscoplastic material, and yield stress fluid are all intended to refer to a viscoplastic material as described herein. Viscoplastic behavior is often associated with highly aggregated suspensions, such as, for example, mud, lava, paints, toothpaste, drilling fluids, ketchup, and chocolate.

The viscoplastic material of the present invention can be any viscoplastic material or any material exhibiting viscoplastic properties that is suitable for use in preparing an anisotropic article. In various aspects, the viscoplastic material can comprise a glass material, a ceramic material, a precursor material (such as, for example, one or more raw reactants that can react to form a ceramic material, or one or more glass material that can be transformed into a glass-ceramic material upon heating), a mineral, a polymeric material or monomer(s) thereof, or a combination thereof. In one aspect, the viscoplastic material comprises a ceramic material (e.g., a powdered ceramic material). In another aspect, the viscoplastic material comprises a mixture of ceramic materials. In another aspect, the viscoplastic material comprises a mixture of ceramic materials and/or precursor materials thereof. In a specific aspect, the viscoplastic material comprises an aluminum silicate, such as mullite.

A viscoplastic material can be provided in any form suitable for forming an anisotropic material. The viscoplastic material can be provided in the form of, for example, a slurry, a paste, or a liquid, provided that the material exhibits viscoplastic behavior when exposed to a magnetic field. In one aspect, the viscoplastic material is provided as a slurry. In a batch stage, a viscoplastic material can exhibit a semi-solid viscoplastic property, such as, for example, when one or more powdered ceramic materials are mixed with water to form a semi-solid slurry. The viscoplastic material can be provided in the form of or substantially in the form of the article to be produced or can be formed into a desired shape prior to, simultaneous with, or subsequent to exposure to a magnetic field. In one aspect, the viscoplastic material is provided in the form of a bulk article having a thickness of at least 1 mm.

The yield stress of a ceramic viscoplastic material can vary, depending upon, for example, the water content of a slurry comprising the one or more ceramic materials. In one aspect, the yield stress of a ceramic viscoplastic material is maintained at the same or approximately the same value throughout the manufacturing and/or processing steps, such as for example, mixing, extrusion, forming, and/or aligning.

The viscoplastic material can optionally be formed into a desired shape prior to, during, or subsequent to exposure to a magnetic field. In one aspect, the viscoplastic material is formed by, for example, an extrusion process, into a complex geometric pattern such as honeycomb pattern. In a specific aspect, the viscoplastic material comprises at least one ceramic material and is formed into a honeycomb structured green body prior to exposure to a magnetic field. Such a forming step can result in a homogeneous distribution of magnetic particles within the formed green body. In another aspect, the forming process can result in a green body having a specific desired distribution of magnetic particles, such as, for example, within the walls of a honeycomb pattern.

As described above, the viscoplastic material can exhibit a desirable yield stress at a specific temperature, such as, for example, at the processing temperature or temperature range of interest. The yield stress of the viscoplastic material should be sufficiently low to allow magnetic particles disposed therein to move and at least partially align upon exposure to a magnetic field, but should also be sufficiently high to prevent particle patterns, once formed, from breaking, upon removal of the magnetic field due to, inter alia, Brownian motion, gravitational force, the magnetic field of the earth, and even vibrations that can be experienced during shipping of such material with the particles magnetically aligned. The yield stress of a particular viscoplastic material can vary with temperature. Thus, a particular viscoplastic material can be selected for use at a given temperature or range of temperatures. Similarly, the temperature of the viscoplastic material can be varied and/or controlled during the exposure and optional fixing steps to provide a specific yield stress.

In one aspect, the viscoplastic material can comprise a mixture of materials, such as, for example, those described in U.S. Pat. No. 3,885,977, which is incorporated by reference. In various aspects, the viscoplastic material can comprise clay, such as, for example, a delaminated kaolin clay, talc, silica, alumina, aluminum hydroxide, a magnesia-yielding chemical, or a combination thereof. In one specific aspect, the viscoplastic material comprises from about 46.6 wt. % to about 53.0 wt. % silica, from about 33.0 wt. % to about 41.0 wt. % alumina, and from about 11.5 wt. % to about 16.5 wt. % magnesia. In another specific aspect, the viscoplastic material comprises about 69.2 wt. % Mulcoa (available from C-E Minerals, King of Prussia, Pa., USA), about 7.7 wt. % Bentolite clay (available from Southern Clay Products, Inc., Gonzales, Tex., USA), about 5.4 wt. % of binder and/or organic material, such as, for example, Methocel (available from Dow Chemical Company, Midland, Mich., USA), and about 17.7 wt. % water. As described above, the specific components and concentrations thereof can vary and the recited examples are not intended to be limiting.

The viscoplastic material can optionally comprise additives to control and/or adjust various physical, chemical, and/or electrical properties of the material. Such optional additives can comprise, for example, a solvent, processing aid, rheological aid, sintering aid, or a combination thereof. In one aspect, the viscoplastic material comprises water. In another aspect, the viscoplastic material comprises a sintering aid, such as, for example, a transition metal oxide.

The viscoplastic material of the present invention can optionally be capable of being fixed. As used herein, a viscoplastic material that has been fixed either no longer exhibits viscoplastic properties or has a yield stress sufficiently high as to prevent a magnetic particle disposed therein from moving by, for example, Brownian motion, or under the force of an applied magnetic field. A viscoplastic material that is capable of being fixed can be fixed by any suitable method, such as, for example, cooling, curing, ceramization, cross-linking, gelling, irradiating, drying, heating, sintering, or firing.

Viscoplastic materials and optional additive materials are commercially available and one of skill in the art could readily select an appropriate viscoplastic material and optional additive suitable for use in the present invention.

Magnetic Particles

The magnetic particles of the present invention can comprise any particles suitable for use in a viscoplastic material and that can be at least partially aligned and/or oriented upon exposure to a magnetic field. The specific magnetic properties, such as, for example, magnetic moment, of a magnetic particle, can vary, provided that at least a portion of the magnetic particles can be moved and/or at least partially aligned upon exposure to a magnetic field. The selection of a particular magnetic particle can vary depending upon the yield stress of the viscoplastic material and/or the strength of the magnetic field used to move and/or at least partially align a portion of the magnetic particles.

The composition of a magnetic particle can be any such composition suitable for use in a viscoplastic material that is capable of moving and/or at least partially aligning upon exposure to a magnetic field. The magnetic particles can, in one aspect, be ferromagnetic. In various specific aspects, the magnetic particles can comprise iron, cobalt, nickel, and/or an alloy, oxide, or combination thereof. In one aspect, a magnetic particle has magnetic properties different from or substantially different from the viscoplastic material. If a viscoplastic material, such as, for example, a ceramic material comprising alumina, titania, zinc oxide, or a combination thereof, exhibits magnetic properties and/or can be oriented upon exposure to a magnetic field, the magnetic particles, in various aspects, can be selected such that they have different or substantially different magnetic properties and can be at least partially oriented and/or aligned separately from the viscoplastic material. The composition of any one or more magnetic particles can vary and it is not required that all magnetic particles comprise the same composition.

The size and geometry of a magnetic particle can vary and the present invention is not intended to be limited to any particular size and/or shape. The present invention comprises a plurality of magnetic particles and each individual magnetic particle or group of magnetic particles can have either the same and/or a different size and geometry than other magnetic particles. It should be understood that particle sizes of magnetic particles can be distributional properties. Thus, a particular size can refer to an average particle diameter and the distribution of individual particle sizes can vary.

The magnetic particles of the present invention can have an average diameter of from about 0.01 µm to about 1,000 µm, for example, 0.01, 0.05, 0.1, 0.5, 1, 3, 5, 7, 10, 20, 40, 60, 70, 100, 200, 400, 500, 700, or 1,000 µm. In one aspect, the magnetic particles have an average diameter of about 7 µm. In another aspect, the magnetic particles have an average diameter of about 70 µm. In yet another aspect, the magnetic particles can comprise a multi-modal distribution of particle sizes, such as, for example, a first mode having an average diameter of about 7 µm and a second mode having an average diameter of about 70 µm.

Figure 2:
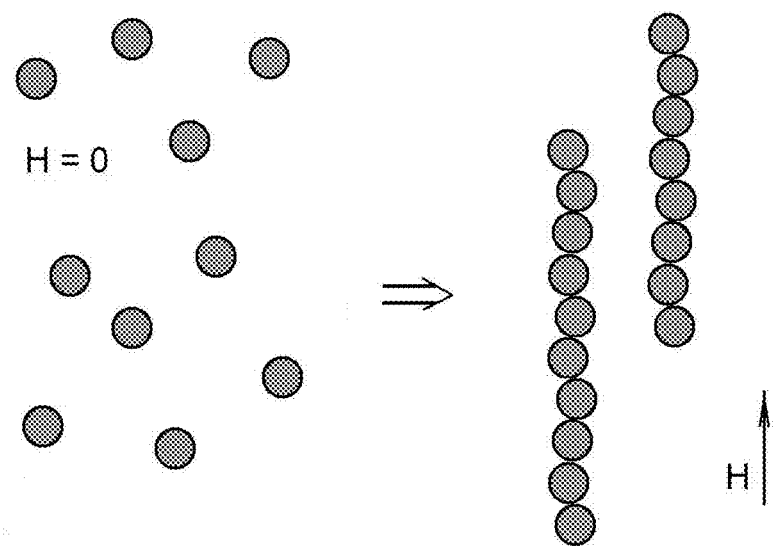
FIG. 2 is a schematic illustrating the orientation and alignment of spherical magnetic particles upon exposure to a magnetic field.

The geometry of a magnetic particle can also vary, provided that the magnetic particle is capable of moving and/or at least partially orienting and/or aligning upon exposure to a magnetic field. A magnetic particle can, in one aspect, have an elongated shape, such as, for example, prolate. Magnetic particles having an elongated shape can, in one aspect, align in a pattern, such as, for example, a line along the axis of the elongated particles, as illustrated in FIG. 1. Such an alignment of elongated magnetic particles can be useful, for example, in the formation of elongated pores in a fired ceramic article. The aspect ratio of an elongated magnetic particle can vary and the present invention is not intended to be limited to a magnetic particle having a particular aspect ratio. In another aspect, a magnetic particle can have a spherical shape, as illustrated in FIG. 2. In another aspect, a magnetic particle can have a flake morphology. In yet another aspect, the plurality of magnetic particles comprises a mixture of magnetic particles having various shapes, such as, for example, elongated particles and spherical particles.

The surface of a magnetic particle can have any morphology and/or surface property suitable for use in the provided viscoplastic material. In one aspect, at least a portion of the magnetic particles have a rough and/or jagged surface. In another aspect, at least a portion of the magnetic particles have a smooth surface.

The magnetic particles of the present invention can exhibit thermal and/or electrical conductivity properties that are substantially different from the viscoplastic material and/or the solid matrix of a finished article. In one aspect, at least a portion of the plurality of magnetic particles have a thermal conductivity that is substantially different from that of the viscoplastic material. In another aspect, at least a portion of the plurality of magnetic particles have an electrical conductivity that is substantially different from that of the viscoplastic material. In another aspect, the plurality of magnetic particles have thermal and electrical conductivities that are substantially different from those of the viscoplastic material.

Figure 3:
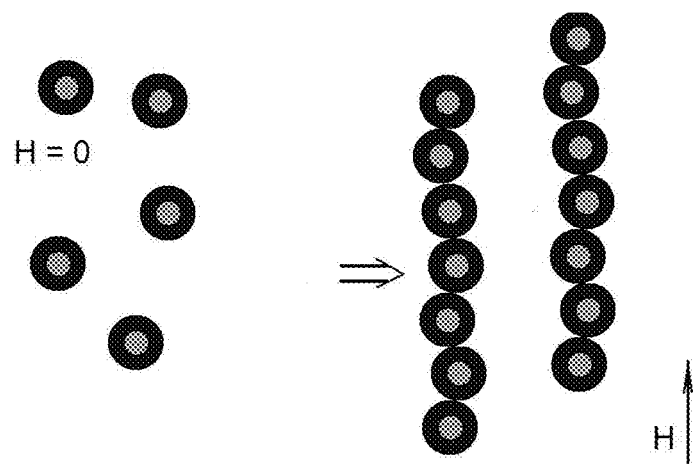
FIG. 3 is a schematic illustrating the orientation and alignment of coated spherical magnetic particles upon exposure to a magnetic field.

The magnetic particles of the present invention can optionally comprise a coating. A coating, if present, can cover a portion of or the entirety of any single magnetic particle and can be uniform or can vary from particle to particle. In one aspect, a coating material covers a portion of each of a plurality of magnetic particles. In another aspect, a coating material covers all of the surface of each of a plurality of magnetic particles, as illustrated in FIG. 3. In another aspect, one or more coating materials can be used and can vary across the surface of any individual or group of magnetic particles. The composition and properties of a particular coating material can vary depending on the intended application and the specific properties to be imparted to either the magnetic particles and/or the viscoplastic material. In one aspect, the magnetic particles comprise a coating that can reduce and/or eliminate chemical reaction between the magnetic particle and the viscoplastic material and/or an additive thereto. In another aspect, the magnetic particles comprise a coating that can reduce and/or eliminate oxidation of a magnetic particle. In yet another aspect, the magnetic particles comprise a coating that can react with a surrounding material. In yet another aspect, the magnetic particles can comprise a coating that can be volatilized and/or removed during a subsequent heating step. In a specific aspect, at least a portion of the magnetic particles comprise a pore-forming material, such as, for example, a starch, that can be volatilized and/or combusted during a subsequent heating step, such as firing of a ceramic article. In another specific aspect, at least a portion of the magnetic particles comprise a polymer coating.

The magnetic particles of the present invention can be added to the viscoplastic material at any level suitable for producing an article having desired anisotropic properties. In various aspects, the magnetic particles can comprise from greater than 0 to about 40 volume percent, for example, about 0.1, 0.3, 0.6, 1.0, 1.3, 1.7, 2.2, 2.6, 3.2, 3.8, 4.1, 4.8, 5.0, 7.0, 10.0, 15.0, 20.0, 25.0, 30.0, 35.0, or 40.0 volume percent of the composition (viscoplastic material and magnetic particles). In one aspect, the volume percent of magnetic particles in a composition is sufficiently high such that at least a portion of the magnetic particles can align in, for example, a head-to-tail fashion. In a specific aspect, the magnetic particles are present at a sufficient level to allow head-to-tail contact between at least a portion of or all of the magnetic particles aligned in a particular pattern. In another aspect, the volume percent of magnetic particles in a composition is sufficiently low such that at least a portion of the magnetic particles are not connected and/or adjacent to other magnetic particles. The specific volume percent of one or more magnetic particles in a composition can vary based on the desired properties or application of a finished article and one of skill in the art could readily select an appropriate volume percent level for a particular viscoplastic material, magnetic particle, and/or intended application.

The magnetic particles of the present invention can be combined with the viscoplastic material in any manner suitable for manufacturing an anisotropic material. The magnetic particles can be at least partially distributed in or on the viscoplastic material. In one aspect, the magnetic particles are distributed in the matrix of the viscoplastic material. In another aspect, the magnetic particles are uniformly mixed in the viscoplastic material. In other various aspects, at least a portion of the magnetic particles are positioned in one or more discrete locations in or on the viscoplastic material, arranged in a pattern in or on the viscoplastic material, or a combination thereof. In various aspects, separate portions of the same of different viscoplastic material comprising varying volume percent levels of magnetic particles can be combined to form a green body having a biased or preferential distribution of magnetic particles. Various forming techniques that can provide non-uniform distributions of materials, such as magnetic particles, are known and one of skill in the art could readily select an appropriate forming technique to extrude and/or form a green body having either a uniform or non-uniform distribution of magnetic particles.

Magnetic particles and optional coating materials are commercially available and one of skill in the art could readily select an appropriate magnetic particle and optional coating material for use in the present invention.

Exposure To Magnetic Field

The magnetic field of the present invention can be any magnetic field suitable for use in moving and/or at least partially orienting and/or aligning at least a portion of the magnetic particles disposed in a viscoplastic material. Further, the magnetic field can be generated by any suitable means provided that at least a portion of the viscoplastic material having a plurality of magnetic particles disposed therein is capable of being exposed to at least a portion of the magnetic field. In one aspect, a portion of the viscoplastic material is exposed to a portion of the magnetic field. In another aspect, all of the viscoplastic material is exposed to a portion of the magnetic field. It is not required that either all of or a portion of a viscoplastic material be positioned at any specific location within the magnetic field.

The magnetic field of the present invention should have a strength sufficient to move and/or at least partially orient and/or align at least a portion of the magnetic particles disposed in the viscoplastic material. The magnetic field can be referred to as B (magnetic induction current) or H (magnetic field, or circumferential velocity of vortices) and can be expressed in units of Tesla (T), amperes per meter (A/m), Gauss (G), or Oersteds ($O_e$). The field strength necessary to orient and positionally align a magnetic particle in a viscoplastic material can be expressed by the equation $$M \cdot H > S \cdot R \cdot \sigma_0$$

where M is the magnetic moment of the magnetic particle, H is the field strength of the magnetic field, S is the surface area of the magnetic particle, R is the half-diameter of the magnetic particle, and $\sigma_0$ represents the yield stress of the viscoplastic material. The present invention is directed to moving and at least partially orienting and/or aligning at least a portion of the magnetic particles disposed in a viscoplastic material. It is not necessary that all of the magnetic particles be moved and/or aligned or that any individual magnetic particle be aligned to a specific extent. Thus, it is preferred, but not necessary that the strength of the magnetic field be sufficient to orient and positionally align almost all or all of the magnetic particles as described by the above equation. In one aspect, the strength of the magnetic field is greater than the strength of the natural magnetic field of the Earth.

In the present invention, the at least partially oriented and/or aligned magnetic particles can remain oriented and/or aligned, provided that the yield stress of the viscoplastic material is sufficiently high to prevent movement, such as, for example, gravitational sedimentation, of the particles, even after removal of the magnetic field. The orientation and position of the at least partially oriented and/or aligned magnetic particles can remain unchanged until such time as they are exposed to another sufficiently strong magnetic field or the viscoplastic material flows under, for example, gravitational force.

In various aspects, the magnetic field can have a field strength of from about 100 to about 100,000 Gauss. In a specific aspect, the magnetic field has a strength of about 6000 G. The field strength of a magnetic field can vary, depending upon the specific magnetic particles used, the specific viscoplastic material, and/or the degree of orientation and/or alignment desired and one of skill in the art could readily select an appropriate magnetic field strength for a specific application.

The viscoplastic material having the plurality of magnetic particles disposed therein can be exposed to the magnetic field for a sufficient time to allow at least a portion of the magnetic particles to move and/or at least partially orient and/or align. The specific time that a viscoplastic material is exposed to the magnetic field can vary, depending on the strength of the magnetic field, the yield stress and temperature of the viscoplastic material, and the particular magnetic particles employed. In one aspect, the viscoplastic material is exposed to the magnetic field for a period of about 30 seconds. In another aspect, the viscoplastic material is exposed to the magnetic field for a period of about 10 minutes.

Upon exposure to the magnetic field, at least a portion of the plurality of magnetic particles can move and at least partially orient and/or align with one or more lines of the magnetic field. The magnetic particles can align to a predetermined position and/or orientation, according to the magnetic field lines, as a result of the torque exerted on the particles by the magnetic field, as illustrated by the prolate, spherical, and coated spherical magnetic particles of FIGS. 1-3.

In one aspect, the magnetic particles of the present invention can be oriented and/or positioned in a three dimensional distribution within a viscoplastic material. In a specific aspect, the magnetic particles can be aligned at various points within a bulk viscoplastic material and the alignment is not limited to a surface portion or thin layer. The magnetic field of the present invention can be one or more separate magnetic fields, each having independent magnetic field lines. In one aspect, the viscoplastic material can be exposed to a plurality of magnetic fields using, for example, one or more electromagnets, to provide complicated orientation and alignment patterns of magnetic particles in a viscoplastic material.

It should be noted that, depending on the nature of the magnetic field and the equipment used for producing the magnetic field, the lines of the magnetic field may not be parallel. Magnetic particles oriented and/or positioned according to the methods of the present invention will align according to the field lines of the magnetic field. Various methods exist to alter the lines of a magnetic field. In addition, a viscoplastic material can be moved within a magnetic field to alter portion of the material exposed to a particular field line. The use of these methods and variants of the methods described herein are intended to be included in the present invention.

It should also be noted that, the magnetic field used for treating the material can vary in direction and/or strength during the process of subjecting the magnetic particles to the magnetic field. Such variation and/or modulation of the magnetic field can, in various aspects, result in a desirable orientation, movement, and/or alignment of at least a portion of the magnetic particles.

In one aspect, the magnetic particles are subjected to the magnetic field after the forming the composition (i.e., viscoplastic material and magnetic particles) into a desired shape and/or geometry. In a specific aspect, a composition comprising a viscoplastic material and a plurality of magnetic particles can be formed into a green body honeycomb structure by, for example, an extrusion process, and subsequently be subjected to a magnetic field such that at least a portion of the magnetic particles disposed within the viscoplastic material are oriented in the cell walls of the green body honeycomb structure. Alternatively, exposure to a magnetic field and thus, orientation and/or alignment of at least a portion of the magnetic particles disposed within a viscoplastic material can be performed prior to a forming step.

Magnetic fields and the equipment for generating magnetic fields are known and commercially available and one of skill in the art could readily select an appropriate magnetic field for a particular combination of viscoplastic material and magnetic particles or for a specific application.

Fixing Magnetic Particles

Once the magnetic particles are at least partially oriented and/or aligned, their orientation and position can optionally be fixed within the viscoplastic material. A fixing step can comprise any suitable technique for permanently or semi-permanently fixing the orientation and position of the magnetic particles within the viscoplastic material. A fixing step, if performed, can vary depending on the nature of the viscoplastic material. In various aspects, the optional fixing step can comprise cooling, curing, cross-linking, ceramizing, irradiating, drying, gelling, heating, sintering, firing, polymerizing, or a combination thereof. A fixed viscoplastic material can be referred to as a solid material and does not exhibit viscoplastic properties. In one aspect, the viscoplastic material comprises a polymeric material that can be cross-linked by, for example, thermal, chemical and/or optical means. In another aspect, the viscoplastic material comprises a slurry comprising a glass material, a ceramic material, or precursor materials thereof that can be dried, heated, and/or fired to form a refractory ceramic body. In a specific aspect, a viscoplastic material comprising mullite, after exposure to a magnetic field, can be dried at about 75° C. for a period of about 24 hours and then be fired to a maximum temperature of about 1,350° C. to form a refractory ceramic.

The optional fixing step of the present invention can be performed during the subjecting step (i.e., exposure to the magnetic field) or after the magnetic field has been removed, withdrawn, and/or diminished to a level that is no longer capable of orienting and/or aligning the magnetic particles. In one aspect, a fixing step is performed during exposure to the magnetic field. In another aspect, a fixing step is performed after the magnetic field has been removed.

Optional Steps

A viscoplastic material comprising at least partially aligned and/or oriented magnetic particles can optionally be subjected to subsequent treatment steps. In one aspect, a fixed material comprising mullite and magnetic particles having a pore-former coating can be heated to volatilize and/or combust the pore-forming material. Alternatively, the pore-forming material can be volatilized and/or combusted during a firing step to for a refractory ceramic. Such a treatment can result in the formation of, for example, a plurality of parallel pores within the body of the refractory ceramic in a pattern matching the location of the at least partially oriented and/or aligned magnetic particles. In one aspect, this technique can be used to provide a controlled pore structure in a ceramic article. In another aspect, this technique can be used to provide an article having a low percentage of dead-end pores. In such an application, the alignment of magnetic particles can improve the distribution of a pore-forming material. In certain application, such as, for example, particulate filters, a ceramic article having a low percentage of dead-end pores can be advantageous by improving the thermal conductivity of the article.

The at least partially oriented and/or aligned magnetic particles can optionally be removed from a finished article using any suitable technique. In one aspect, at least a portion of the magnetic particles can be removed from a pore by, for example, an acid washing technique. A finished article of the present invention can comprise the plurality of magnetic particles, a portion of the plurality of magnetic particles, or no magnetic particles, and the present invention is not intended to be limited to a specific aspect having magnetic particles remaining disposed therein.

In another aspect, at least a portion of the plurality of magnetic particles can be fused together during, for example, a subsequent heating and/or firing step.

Although several aspects of the present invention have been illustrated in the accompanying drawings and described in the detailed description, it should be understood that the invention is not limited to the aspects disclosed, but is capable of numerous rearrangements, modifications and substitutions without departing from the spirit of the invention as set forth and defined by the following claims.

EXAMPLES

To further illustrate the principles of the present invention, the following examples are put forth so as to provide those of ordinary skill in the art with a complete disclosure and description of how the compositions, articles, devices, and methods claimed herein are made and evaluated. They are intended to be purely exemplary of the invention and are not intended to limit the scope of what the inventors regard as their invention. Efforts have been made to ensure accuracy with respect to numbers (e.g., amounts, temperatures, etc.); however, some errors and deviations should be accounted for. Unless indicated otherwise, temperature is ° C. or is at ambient temperature, and pressure is at or near atmospheric. There are numerous variations and combinations of process conditions that can be used to optimize product quality and performance. Only reasonable and routine experimentation will be required to optimize such process conditions.

Example 1

Preparation of Mullite Articles

Figure 4:
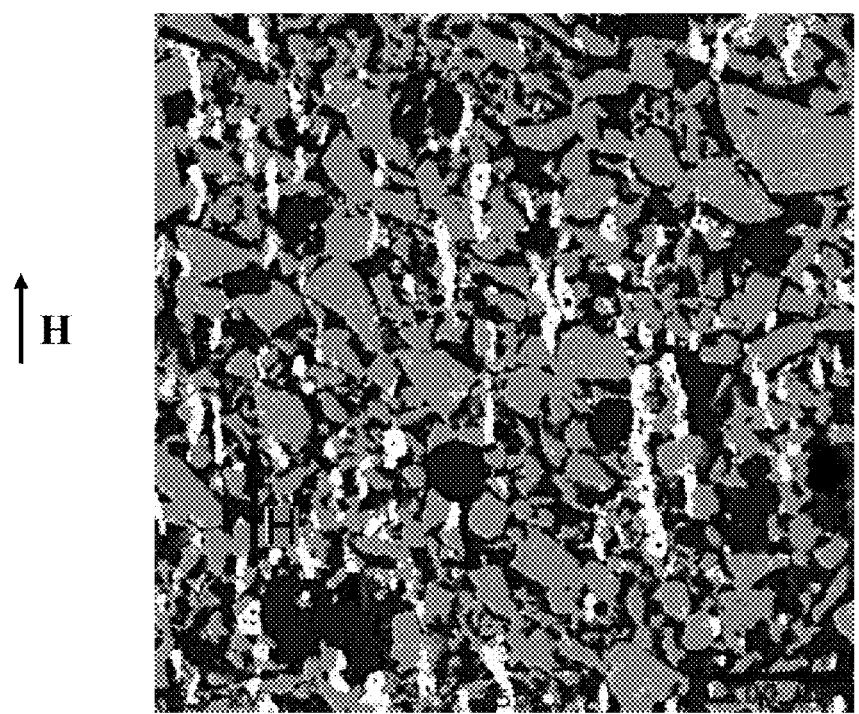
FIG. 4 is a scanning electron micrograph illustrating the orientation and alignment of iron particles having a 7 µm average particle diameter in a mullite article, in accordance with various aspects of the present invention.
Figure 5:
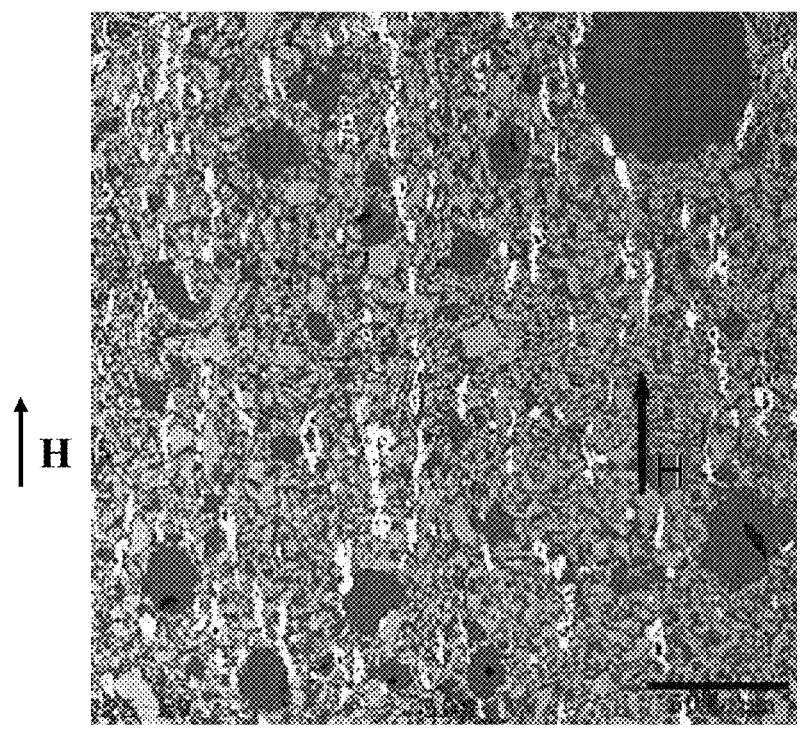
FIG. 5 is a scanning electron micrograph illustrating the orientation and alignment of iron particles having a 70 µm average particle diameter in a mullite article, in accordance with various aspects of the present invention.

In a first example, two test articles were prepared by mixing mullite powder (such as that available from C-E Minerals, King of Prussia, Pa., USA) with iron powder. A first article was prepared by mixing a mullite powder, an iron powder having a 7 μm average particle diameter (available from Alfa Aesar, Ward Hill, Mass., USA), and water to form a cement slurry. A second article was similarly prepared by mixing a mullite powder, an iron powder having a 70 μm average particle diameter (available from ESPI Metals, Ashland, Oreg., USA), and water to form a cement slurry. Each slurry sample was exposed to a uniform magnetic field of 6000 Gauss for 30 seconds. After exposure, the cement samples were dried at 75° C. for 24 hours and subsequently fired to a maximum temperature of 1,350° C. The volume fraction of iron particles in each fired article did not exceed 5%. FIGS. 4 and 5 illustrate the orientation and alignment of the iron particles (light or white areas) in the mullite articles after exposure to the magnetic field. The position and alignment of iron particles within each sample, as illustrated in FIGS. 4 and 5, was similar and not dependent on the size and/or shape of the iron particles.

Throughout this application, various publications are referenced. The disclosures of these publications in their entireties are hereby incorporated by reference into this application in order to more fully describe the compositions, articles, device, and methods described herein.

Various modifications and variations can be made to the compositions, articles, devices, and methods described herein. Other aspects of the compositions, articles, devices, and methods described herein will be apparent from consideration of the specification and practice of the compositions, articles, devices, and methods disclosed herein. It is intended that the specification and examples be considered as exemplary.

What is claimed is:

1. A process for manufacturing an anisotropic material comprising:
   a) providing a viscoplastic material having a yield stress, and a plurality of magnetic particles disposed therein and suspended throughout the viscoplastic material;
   b) forming the viscoplastic material into a desired shape;
   c) optionally, extruding the viscoplastic material; and
   d) subjecting the viscoplastic material to a magnetic field for a time sufficient to at least partially align at least a portion of the magnetic particles to at least one of a predetermined position or orientation,
   wherein a stress is created on the viscoplastic material by Brownian motion and/or gravitational force of least a portion of the plurality of magnetic particles, wherein the stress is less than the yield stress of the viscoplastic material, and
   wherein the yield stress of the viscoplastic material is maintained at the same or approximately the same value throughout the process steps of providing, forming, extruding, and subjecting.

2. The process of claim 1, wherein the desired shape is a honeycomb structure.

3. The process of claim 1, wherein at least a portion of the plurality of magnetic particles have a thermal conductivity and/or an electrical conductivity substantially different from the viscoplastic material.

4. The process of claim 1, wherein, after subjecting, at least a portion of the plurality of magnetic particles are oriented in a head-to-tail pattern.

5. The process of claim 1, wherein at least a portion of the plurality of magnetic particles subjected to the magnetic field create a stress on the viscoplastic material greater than the yield stress.

6. The process of claim 1, wherein the viscoplastic material comprises a glass material, a ceramic material, and/or a precursor or combination thereof.

7. The process of claim 1, wherein at least a portion of the plurality of magnetic particles are ferromagnetic.

8. The process of claim 1, wherein at least a portion of the plurality of magnetic particles are at least partially distributed in at least a portion of the viscoplastic material.

9. The process of claim 1, wherein at least a portion of the plurality of magnetic particles are spherical, elongated, or a combination thereof.

10. The process of claim 1, wherein at least a portion of the plurality of magnetic particles comprise a pore-forming material.

11. The process of claim 1, further comprising fixing at least a portion of the plurality of magnetic particles within the viscoplastic material in an at least partially aligned state.

12. The process of claim 11, wherein the fixing is carried out after the magnetic field has been removed, withdrawn, and/or diminished to a level that is no longer capable of orienting and/or aligning the magnetic particles.

13. The process of claim 11, wherein fixing comprises at least one of cooling, curing, ceramizing, cross-linking, gelling, sintering, polymerizing, irradiating, heating, or firing the viscoplastic material.

14. The process of claim 11, wherein at least a portion of the plurality of magnetic particles comprise a pore-forming material, and further comprising heating the viscoplastic material, after fixing, to form a plurality of pores.

15. The process of claim 14, wherein at least a portion of the magnetic particles, after step b), are in contact such that upon heating, at least a portion of the plurality of pores connect in a head-to-tail fashion to form a line.

16. The process of claim 14, wherein at least a portion of the plurality of magnetic particles react with a surrounding material during the fixing step.

17. The process of claim 14, wherein at least a portion of the pore-forming material volatilizes during the fixing step such that a void is created.

18. The process of claim 14, wherein the fixing step comprises the formation of a fired ceramic material from at least one precursor material thereof.

19. The process of claim 1, wherein the viscoplastic material has a thickness of greater than about 1 mm.

20. The process of claim 1, wherein the magnetic field comprises a plurality of magnetic fields.

* * * * *